(12) United States Patent
Herkommer et al.

(10) Patent No.: US 9,726,230 B2
(45) Date of Patent: Aug. 8, 2017

(54) LEVER SYSTEM

(71) Applicant: SCHAEFFLER TECHNOLOGIES AG & CO. KG, Herzogenaurach (DE)

(72) Inventors: Dominik Herkommer, Schriesheim (DE); Markus Baehr, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 222 days.

(21) Appl. No.: 14/412,606

(22) PCT Filed: Jun. 17, 2013

(86) PCT No.: PCT/EP2013/062455
§ 371 (c)(1),
(2) Date: Jan. 2, 2015

(87) PCT Pub. No.: WO2014/005824
PCT Pub. Date: Jan. 9, 2014

(65) Prior Publication Data
US 2016/0195178 A1 Jul. 7, 2016

(30) Foreign Application Priority Data
Jul. 3, 2012 (DE) ........................ 10 2012 211 486

(51) Int. Cl.
*F16D 23/12* (2006.01)

(52) U.S. Cl.
CPC ........ *F16D 23/12* (2013.01); *F16D 2023/126* (2013.01); *Y10T 74/20564* (2015.01); *Y10T 74/20582* (2015.01)

(58) Field of Classification Search
CPC ............... F16D 23/12; F16D 2023/126; Y10T 74/20564; Y10T 74/20582
USPC ......................................................... 192/99 S
See application file for complete search history.

(56) References Cited

U.S. PATENT DOCUMENTS

| 7,124,871 | B2 | 10/2006 | Friedmann et al. | |
|---|---|---|---|---|
| 2003/0066377 | A1* | 4/2003 | Spaizar | B62K 23/06 74/551.1 |
| 2009/0000900 | A1* | 1/2009 | Becht | F16D 13/752 192/70.252 |
| 2012/0175213 | A1* | 7/2012 | Burkhart | F16D 25/08 192/48.601 |

FOREIGN PATENT DOCUMENTS

| CN | 100482965 C | 4/2009 |
|---|---|---|
| DE | 102004009832 A1 | 9/2004 |
| DE | 102006043330 A1 | 4/2007 |
| DE | 102007029934 A1 | 1/2008 |
| DE | 102013211227 A1 | 1/2014 |
| EP | 1770299 A2 | 4/2007 |
| WO | 2007134563 A1 | 11/2007 |
| WO | 2008154896 A1 | 12/2008 |
| WO | 2010035030 A2 | 4/2010 |

* cited by examiner

*Primary Examiner* — Richard Lorence
(74) *Attorney, Agent, or Firm* — Simpson & Simpson, PLLC

(57) ABSTRACT

A lever system for actuating at least one clutch, comprising at least one pivotable lever that has a certain bending stiffness. The lever has at least one flexurally elastic zone which is designed and/or arranged in such a way that the bending stiffness of the lever varies in accordance with an actuation path of the clutch.

16 Claims, 3 Drawing Sheets

LEVER SYSTEM

CROSS-REFERENCE TO RELATED APPLICATIONS

The present application is the U.S. national stage application pursuant to 35 U.S.C. §371 of international Application No. PCT/EP2013/062455, filed on Jun. 17, 2013, which application claims priority from German Patent Application No. DE 10 2012 211 486.6, filed on Jul. 3, 2012, which applications are incorporated herein by reference in their entireties.

TECHNICAL FIELD

The invention relates generally to a lever system for actuating at least one clutch, and, more specifically, to a lever system for actuating at least one clutch comprising at least one pivotable lever that has a certain bending rigidity. The invention further relates to an actuating device for actuating at least one clutch by means of a lever system of this type. The invention further relates to a clutch device comprising at least one clutch that has a regressive characteristic map and is actuated by a lever system of this type.

BACKGROUND

The published German Patent Application No. DE 10 2004 009 832 A1 (Friedman et al.) describes a lever system for actuating clutches comprising a lever with a first side and a second side and with at least one point of contact, which may simultaneously represent a fulcrum.

The published German Patent Application No. DE 10 2006 043 330 A1 (Reefer et al.) describes a lever system for actuating a clutch comprising a lever that is supported for rotation about a joint on one side and in operative connection with a pressure means on the other side. In a point of contact located on a cam track, the lever is supported on a carriage that is displaceable in a radial direction by means of a motor-driven spindle.

SUMMARY

The invention is a lever system for actuating at least one clutch comprising at least one pivotable lever having a certain flexural rigidity wherein the lever has at least one flexurally elastic region that is designed and/or arranged in such a way that the flexural rigidity of the lever varies as a function of an actuating path of the clutch.

An object of the invention is to improve the actuation of clutches that have a regressive characteristic map.

In accordance with the invention, in a lever system for actuating at least one clutch comprising at least one pivotable lever that has a certain flexural rigidity, this object is attained by the fact that the lever has at least one elastic region that is designed and/or arranged in such a way that that the flexural rigidity of the lever varies as a function of the actuating path of the clutch. In this way, characteristic map curves of a characteristic map plotting the actuation force above the actuating path of the clutch may advantageously diverge. The lever system of the invention is preferably used as a clutch actuator in automated transmissions, in particular in twin clutch transmissions.

In accordance with an example embodiment of the lever system, the lever has a negative rigidity gradient across the actuating path of the clutch. The rigidity of the lever decreases as the actuating path of the clutch increases.

In accordance with another example embodiment of the lever system, an actuating contact area is arranged between a pivot for pivotably arranging the lever and a region of contact for a roller. In the actuating contact region, the lever gets into contact with an actuating element of the clutch. The actuating element may be an axial bearing, for example. In the point of contact, the lever is supported on a traverse carriage that is displaceable in a radial direction by means of a motor-driven spindle.

In accordance with a further example embodiment of the lever system, a cam track for the roller is formed in the region of contact on the lever in such a way that the actuating path of the clutch increases as the distance between the roller and a clutch axis increases. What is referred to as a clutch axis is an axis of rotation of the clutch, for example. The internal rigidity of the lever causes the effective actuation rigidity of the lever to decrease as the distance between the region of contact of the roller and the clutch axis increases.

In accordance with an example embodiment of the lever system, the flexurally elastic region is arranged between the actuating contact region and the pivot for pivotably arranging the lever. The flexural elasticity in the flexurally elastic region may be implemented by the use of less or different material.

In accordance with an example embodiment of the lever system, the flexurally elastic region extends from the pivot for pivotably arranging the lever beyond the actuating contact region. Thus, a sufficient degree of deformation may be attained in a simple way without exceeding the tension limits of the material.

In accordance with an example embodiment of the lever system, the flexurally elastic region is implemented by a counter-spring rigidity associated with the pivot for pivotably arranging the lever. The pivot may be spring-mounted with the aid of a spring device. Due to the spring device, which has a defined rigidity, the pivot may be displaced to a limited extent in a direction parallel to a line of action of the actuation force of the clutch.

In accordance with an example embodiment of the lever system, the lever for actuating two partial clutches of a twin clutch is combined with a lever actuator. The lever actuator is preferably arranged to be perpendicular to the lever of the invention. The lever actuator may be embodied as a lever engagement element as described in international patent application publication no. WO 2008/154896 A1 (Franz et al.).

The invention further relates to an actuating device for actuating at least one clutch, comprising a lever system as described above. Depending on the construction of the clutch, the actuating device may be referred to as an engagement device.

The invention furthermore relates to a clutch device comprising at least one clutch that has a regressive characteristic map and is actuated by the lever system described above. Depending on the construction of the clutch, an actuation of the clutch may also be referred to as an engagement of the clutch. With the aid of the lever system of the invention, a characteristic map that is comparatively rigid for small engagement paths of the clutch and becomes softer for longer engagement paths may be implemented in a simple way.

These and other objects, advantages and features of the present invention will be better appreciated by those having ordinary skill in the art in view of the following detailed description of the invention in view of the drawings.

BRIEF DESCRIPTION OF THE DRAWINGS

The invention will now be described in greater detail by reference to the accompanying figures, in which the figures represent the following.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
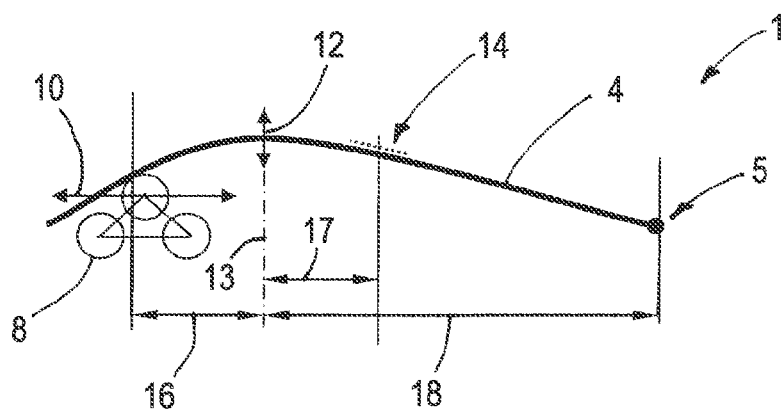
FIG. 1 is a simplified representation of a lever system of the invention having an elastic region.
Figure 2:
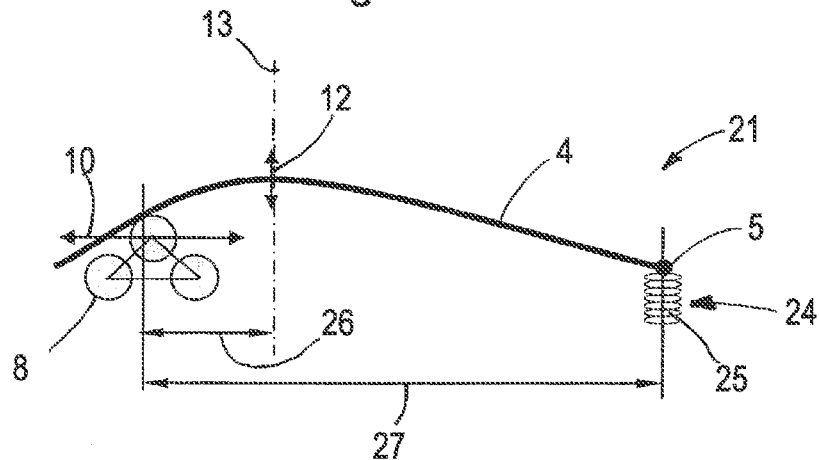
FIG. 2 illustrates a lever system similar to the one shown in FIG. 1 comprising a counter-spring rigidity associated with a pivot of the lever system.
Figure 3:
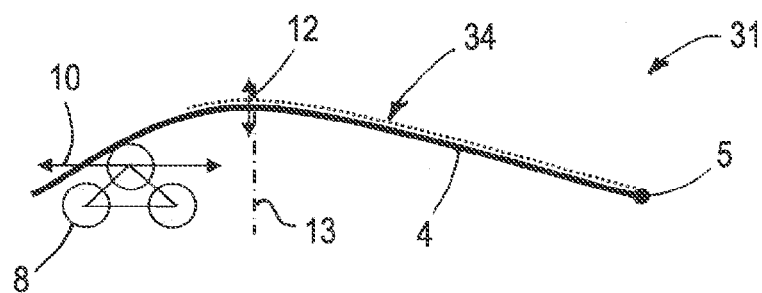
FIG. 3 illustrates a lever system similar to the one shown in FIG. 1 comprising a larger flexurally elastic region.

FIGS. 1 to 3 are simplified representations of various exemplary embodiments of lever system 1, 21, and 31 of the invention. In the drawings, identical or similar elements are indicated by identical reference symbols. The first few paragraphs that follow will describe the aspects lever systems 1, 21, and 31 have in common. Then the differences between the individual exemplary embodiments will be explained.

Lever system 1, 21, and 31 comprises lever 4 that is arranged in a hinge-like manner to pivot on a (non-illustrated) support structure as indicated by pivot 5. Due to its pivotal or hinge-like arrangement, lever 4 may be referred to as a hinge lever.

Pivot 5 is formed on one end of lever 4. The opposite end of lever 4 rests on carriage 8. As indicated by double-headed arrow 10, carriage 8 is movable back and forth in a horizontal direction. For this purpose, rollers are provided on the bottom of carriage 8 to roll on a corresponding track in a horizontal direction.

A corresponding cam track of lever 4 rests on an upper roller of carriage 8. The shape of the cam track formed on lever 4 is selected such that as indicated by double-headed arrow 12, an actuating contact region of the lever moves upward when carriage 8 moves away from pivot 5.

Double-headed arrow 12 is located on line of action 13 of the actuation force of the clutch. When carriage 8 moves towards pivot 5, lever 4 with its actuating contact region moves downward.

Carriage 8 with the rollers and the cam track on lever 4 form a cam mechanism integrated in lever system 1, 21, and 31. The opposing arrangement of pivot 5 and carriage 8 or rather the cam mechanism causes an actuation three of the clutch, also referred to as an engagement force, to be distributed between carriage 8 and pivot 5. As a result, the overall force for actuating the clutch may be lower than in the case of a lever actuator as described in the international patent application publication no. WO 2008/154896 A1, for instance.

In lever system 1 shown in FIG. 1, double-headed arrow 16 indicates distance $R_R$ between carriage 8 and line of action 13 of the actuation force. Double-headed arrow 17 indicates distance $L_1$ between line of action 13 and flexurally elastic region 14. Further double-headed arrow 18 indicates distance $L_0$ between line of action 13 and pivot 5.

Flexurally elastic region 14 has flexural rigidity $c_T$ indicated in newton meters per rad. Based on flexural rigidity $c_T$, the effective actuation rigidity or engagement rigidity of lever 4 is calculated as follows:

$$c_{\text{eff}} = c_T\left(\frac{1}{R_R + L_1} + \frac{1}{L_0 - L_1}\right)\left(\frac{1}{R_R} + \frac{\frac{L_1}{R_R} + 1}{L_0 - L_1}\right) \text{ for } L_1 \geq 0$$

$$c_{\text{eff}} = c_T\left(\frac{1}{R_R + L_1} + \frac{1}{L_0 - L_1}\right)\left(\frac{1}{L_0} + \frac{L_0 - L_1}{L_0(R_R + L_1)}\right) \text{ for } L_1 \leq 0$$

The effective rigidity progressively diverges the closer flexurally elastic region 14 is to carriage 8. If $L_1$ equals zero, i.e. if flexurally elastic region 14 is arranged in the region of the intersection between line of action 13 and lever 4, i.e. directly beneath the engagement system, the equation reads:

$$c_{\text{eff}\_1} = c_T\left(\frac{1}{R_R} + \frac{1}{L_C}\right)^2$$

If the position of carriage 8 ($R_R$) varies between 40 and 80 millimeters and $L_1$ equals zero, the effective rigidity changes by a factor nine to four.

The internal rigidity or elasticity of lever 4 causes the effective engagement rigidity of lever 4 to decrease as the distance of the point of contact on the upper roller of carriage 8 increases. Thus, an increasing axial distance between the upper roller of carriage 8 and pivot 5 results in a decreasing rigidity of lever system 1 as the engagement or actuating path increases.

In lever system 21 shown in FIG. 2, flexurally elastic region 24 of lever 4 is represented by counter-spring 25, which has a defined rigidity, also referred to as counter-spring rigidity. Counter spring 25 is arranged directly beneath pivot 5.

Double-headed arrow 26 indicates distance $R_R$ between carriage 8 and line of action 13. Double-headed arrow 27 indicates sum $R_R$ plus $L_0$. For lever system 21 shown in FIG. 2, due to the translation of the counter-spring rigidity on lever 4 supported on the upper roller as a fixed point, the effective engagement rigidity of lever 4 is calculated as follows:

$$i = \frac{R_R}{R_R + L_0}$$

The effective rigidity in the actuating region, i.e. in the intersection between line of action 13 and lever 4, is calculated as follows:

$$c_{\mathit{eff}\_2} = \frac{c_G}{i^2}$$

If the counter-arm of lever 4 has length $L_0$ of 80 millimeters and the roller path of carriage 8 described above is between 40 and 80 millimeters, for example, the effective rigidity likewise varies by a factor nine to four.

In lever system 31 shown in FIG. 3, lever 4 has flexurally elastic region 34 that is significantly larger than flexurally elastic region 14 of lever system 1 shown in FIG. 1. Flexurally elastic region 34 on lever 4 extends from pivot 5 beyond the actuating contact region of lever 4. This is a simple way of allowing the lever to be sufficiently deformed without exceeding tension limits of the material lever 4 is made of.

Figure 4:
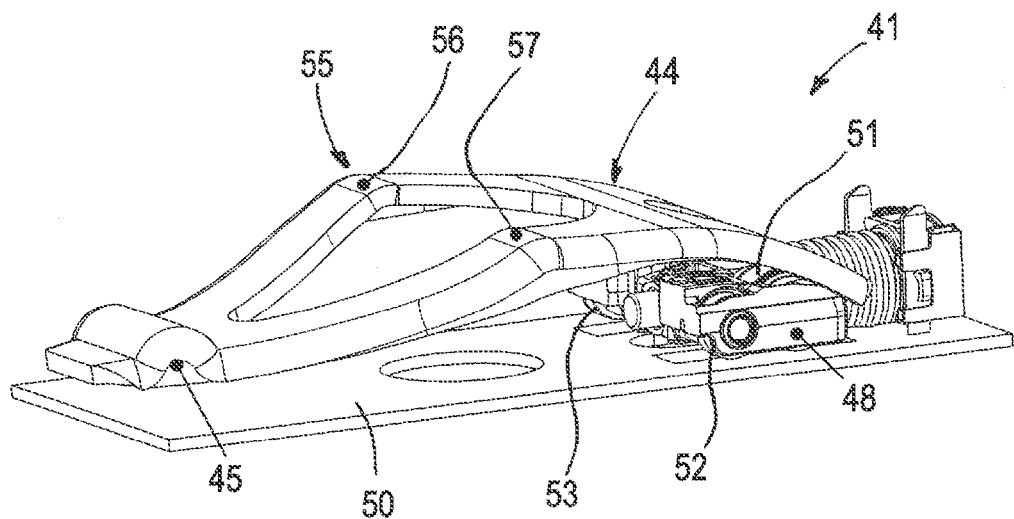
FIG. 4 illustrates an embodiment of the lever system shown in a simplified way in FIG. 3.

FIG. 4 is a perspective view of an embodiment of lever system 41 including lever 44. On one end, lever 44 has a curved section formed like a depression to indicate pivot 45. Carriage 48 is associated with the opposite end of lever 48. Lever 48 is movable on base plate 50. Roller 51 is supported for rotation on carriage 48. Lever 44 has a cam track that rests on roller 51. Two further rollers 52, 53 are provided for the carriage to be movable on base plate 50.

Approximately at the center on its upper side, lever 44 has actuating contact region 55. Actuating contact region 55 comprises two contact surfaces 56, 57. In the assembled state of lever system 41, these contact surfaces 56, 57 are in contact with a (non-illustrated) actuation bearing or apply bearing of the clutch. Between contact surfaces 56, 57, lever 44 has a through-hole for example, for a transmission shaft to pass through.

Figure 5:
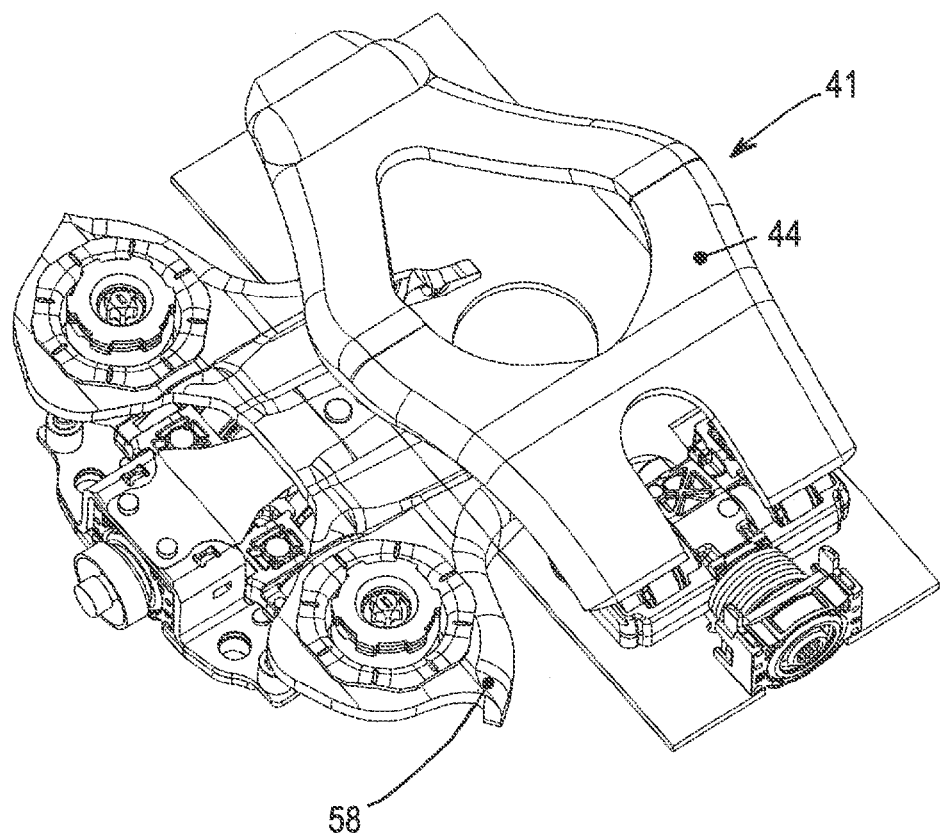
FIG. 5 illustrates the lever system of FIG. 4 with an additional lever actuator.

FIG. 5 is a perspective view of lever system 41 with lever 44 of FIG. 4 advantageously combined with lever actuator 58. The illustrated combination simplifies the actuation of two partial clutches in a specific twin clutch to a considerable extent.

Figure 6:
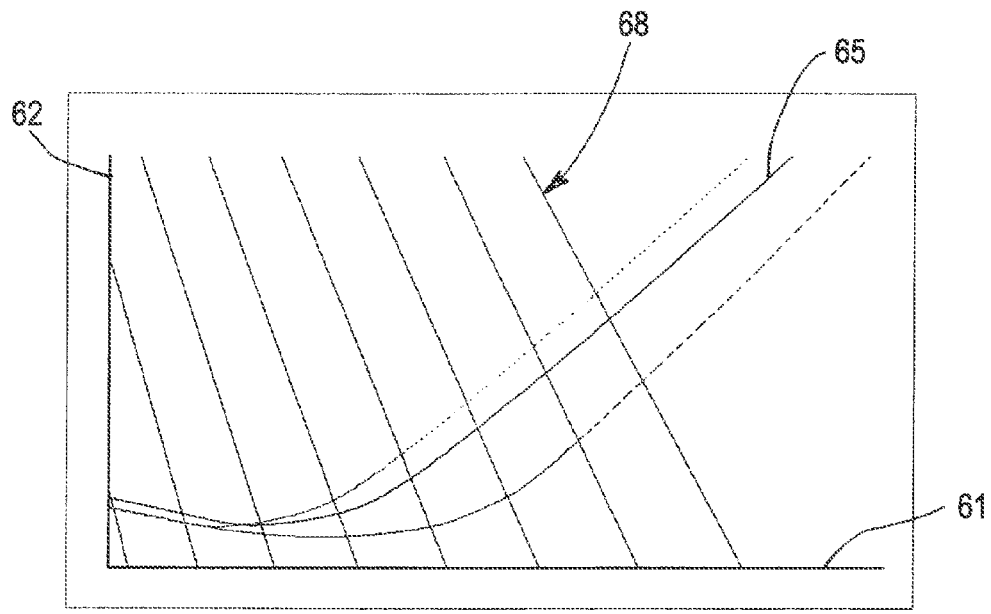
FIG. 6 illustrates a Cartesian coordinate system with a characteristic map of the lever system of FIG. 4; and, FIG. 7 illustrates a Cartesian coordinate system with a characteristic map that incorporates a counter-spring.
Figure 7:
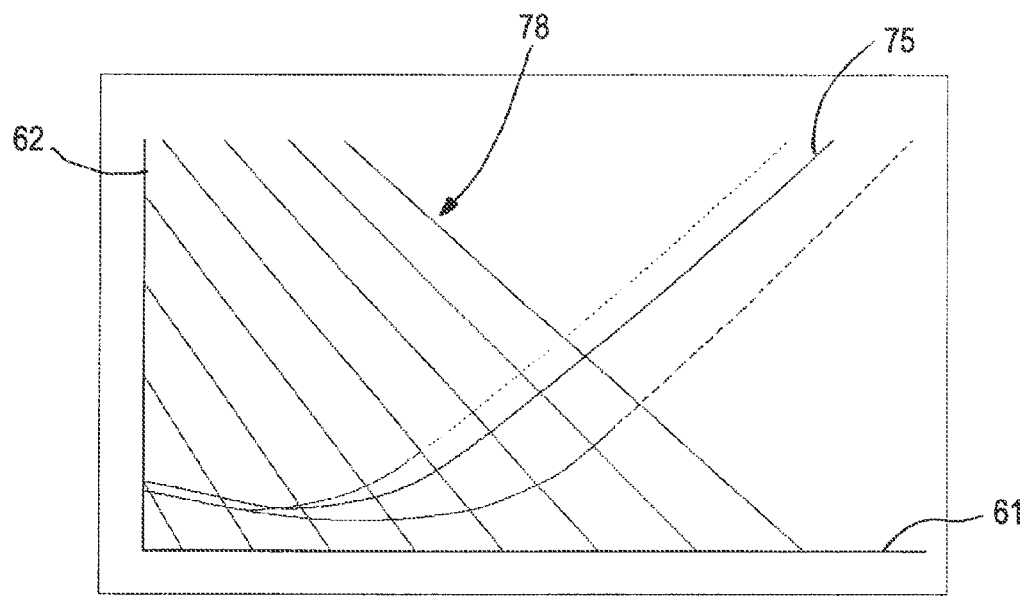

FIGS. 6 and 7 illustrate two Cartesian coordinate systems with x-axis 61 and y-axis 62. Y-axis 62 shows the engagement or actuation force of a clutch that is actuated with the aid of a lever system as described above. X-axis 61 shows the associated actuating or engagement path.

The Cartesian coordinate system represents nominal characteristic lines 65, 75 of the clutch. The dotted lines above and the dashed lines below nominal characteristic lines 65, 75 of the clutch indicate maximum and minimum characteristic lines of the clutch.

The coordinate system shown in FIG. 6 illustrates characteristic map 68 of the lever system shown in FIG. 4. The coordinate system shown in FIG. 7 indicates characteristic map 78 additionally factoring in a counter-spring such as counter-spring 25 shown in FIG. 2.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

LIST OF REFERENCE SYMBOLS

1 Lever system
4 Lever
5 Pivot
8 Carriage
10 Double-headed arrow
11 Double-headed arrow
13 Line of action
14 Flexurally elastic region
16 Double-headed arrow
17 Double-headed arrow
18 Double-headed arrow
21 Lever system
24 Flexurally elastic region
25 Counter-spring
26 Double-headed arrow
27 Double-headed arrow
31 Lever system
34 Flexurally elastic region
41 Lever system
44 Lever
45 Pivot
48 Carriage
50 Base plate
51 Roller
52 Roller
53 Roller
55 Actuating contact region
56 Contact surface
57 Contact surface
58 Lever actuator
61 X axis
62 Y axis
65 Characteristic line
68 Characteristic map
75 Characteristic line
78 Characteristic map

What is claimed is:

1. A lever system for actuating at least one clutch, comprising:
   at least one pivotable lever having a first flexural rigidity, wherein said lever has at least one flexurally elastic region, the at least one flexurally elastic region including a second flexural rigidity and is designed and/or arranged in such a way that said flexural rigidity of said lever varies as a function of an actuating path of said clutch;
   a carriage positioned on a bottom surface of the lever, wherein the carriage is arranged at a first end of the lever and a second end of the lever, opposite the first end, is pivotably fixed at a pivot.

2. The lever system recited in claim 1, wherein said lever has a negative rigidity gradient across said actuating path of said clutch.

3. The lever system recited in claim 1, wherein an actuating contact region is arranged between the pivot and a contact region for an upper roller of the carriage.

4. The lever system recited in claim 3, wherein a cam track is formed in said contact region for said upper roller on said lever in such a way that said actuating path of said clutch increases as a distance between said roller and a clutch axis increases.

5. The lever system recited in claim 3, wherein said flexurally elastic region is arranged between said actuating contact region and said pivot.

6. The lever system recited in claim 3, wherein said flexurally elastic region extends from said pivot beyond said actuating contact region.

7. The lever system recited in claim 3, wherein said flexurally elastic region is implemented by a counter-spring on which said pivot is mounted.

8. The lever system recited in claim 1, wherein said lever for actuating two partial clutches of a twin clutch is combined with a lever actuator.

9. An actuating device for actuating at least one clutch comprising said lever system as recited in claim 1.

10. A clutch device comprising at least one clutch that has a regressive characteristic map and is actuated by said lever system as recited in claim 1.

11. The lever system recited in claim 1, wherein the second flexural rigidity is different than the first flexural rigidity.

12. The lever system recited in claim 1, wherein the second flexural rigidity is less than the first flexural rigidity.

13. A lever system for actuating at least one clutch, comprising:
    at least one pivotable lever having a first flexural rigidity and a contact area to output an actuation force of said lever, wherein said lever has at least one flexurally elastic region, the at least one flexurally elastic region including a second flexural rigidity and is designed and/or arranged in such a way that said flexural rigidity of said lever varies as a function of an actuating path of said clutch, said lever pivotably secured at a first end of said lever;
    wherein, the contact area of said lever is arranged on said lever at a first distance from said first end of said lever, and said flexurally elastic region is arranged on said lever at a second distance from said first end of said lever.

14. The lever system recited in claim 13, wherein said first distance is greater than said second distance.

15. The lever system recited in claim 13, wherein said first distance is less than said second distance.

16. The lever system recited in claim 13, wherein said first distance is equal to said second distance.

* * * * *